US007893927B2

(12) United States Patent
Yoshihara (10) Patent No.: US 7,893,927 B2
(45) Date of Patent: Feb. 22, 2011

(54) TOUCH SCREEN DEVICE WITH GUIDING SURFACE

(75) Inventor: Keiichiro Yoshihara, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 588 days.

(21) Appl. No.: 10/664,080

(22) Filed: Sep. 17, 2003

(65) Prior Publication Data

US 2004/0056847 A1    Mar. 25, 2004

(30) Foreign Application Priority Data

Sep. 20, 2002    (JP)    ............................ P2002-274822

(51) Int. Cl.
    G06F 3/041    (2006.01)
(52) U.S. Cl. ..................................... 345/173
(58) Field of Classification Search ................ 345/156, 345/173; D14/318, 389; 715/733; 701/36
    See application file for complete search history.

(56) References Cited

U.S. PATENT DOCUMENTS

| 4,631,525 A | * | 12/1986 | Serravalle, Jr. ............... 345/173 |
| 4,954,967 A | * | 9/1990 | Takahashi .................... 345/173 |
| 5,559,301 A |  | 9/1996 | Bryan, Jr. et al. |
| 5,598,527 A | * | 1/1997 | Debrus et al. ................. 345/173 |
| 5,748,185 A |  | 5/1998 | Stephan et al. |
| 5,943,044 A | * | 8/1999 | Martinelli et al. ............ 345/174 |
| 6,049,328 A | * | 4/2000 | Vanderheiden ............... 345/173 |
| 6,160,213 A |  | 12/2000 | Arnold et al. |
| 6,373,472 B1 | * | 4/2002 | Palalau et al. ................ 345/173 |
| 6,559,833 B2 | * | 5/2003 | Rowe .......................... 345/174 |
| 7,143,355 B2 | * | 11/2006 | Yamaguchi et al. ......... 715/733 |
| 2005/0024341 A1 | * | 2/2005 | Gillespie et al. ............. 345/173 |

FOREIGN PATENT DOCUMENTS

| EP | 1 098 241 A2 | 5/2001 |
| JP | 63-34635 | 2/1988 |
| JP | 2001-154766 | 6/2001 |
| WO | WO 99/61973 | 12/1999 |

OTHER PUBLICATIONS

European Search Report dated Dec. 23, 2005.
Anonymous, "Improved touchscreen products", Research Disclosure, Mason Publications, Hampshire, GB, vol. 428, No. 53, Dec. 1999.
European Search Report for EP 03021320.1-2211 dated Dec. 23, 2005.

* cited by examiner

Primary Examiner—Willial L Boddie
(74) Attorney, Agent, or Firm—McGinn IP Law Group PLLC (57) ABSTRACT

In a display touch sensor, there configured a guide shape which protrudes from a surface of the touch sensor placed on a display surface of a display and fringes with the surface of the touch sensor with a line using a concave portion as a vertex, and a main CPU for setting a position of the touch sensor corresponding to the vertex of the line of the guide shape to a reference position and changing an adjustment value based on a direction of a slide operation from the reference position.

26 Claims, 7 Drawing Sheets

TOUCH SCREEN DEVICE WITH GUIDING SURFACE

BACKGROUND OF THE INVENTION

1. Field of the Invention

The present invention relates to an electronic equipment including a touch sensor placed on a screen of a display part and instructions are input in response to depression thereof.

2. Description of the Related Art

In a CRT touch switch apparatus disclosed in JP-A-63-034635 (specifically on page 1), which is a conventional example of an electronic equipment relating to the present invention, the apparatus includes a touch switch part in which plural switches are placed on a display part in matrix shape, switch detecting means for detecting operations of the switches of the touch switch part, and display movement means for detecting a direction in which the touch switch part is traced by the switch detection means and moving the switches.

Also, in a grope operation apparatus disclosed in JP-A-2001-154766 (specifically at paragraph [0005] and in FIG. 1), which is another conventional example of the electronic equipment relating to the present invention, the apparatus includes a display device having a display screen, a touch panel provided on the display screen and outputs position information indicating a contact point on the touch panel at which an operator touches, identification means for identifying an action commanded by touching at the touch panel by the operator in response to the position information and controller for outputting a control signal in response to output of the identification means. In the grope operation apparatus, the identification means is constructed so that each area of four corners of the touch panel is set to the end and the contact point moving from one end to another end is detected based on the position information and the action commanded by the operator is identified by the movement start end and the movement completion end of the contact point detected.

However, in the conventional electronic equipment, there was a problem that a reference position of an operation for specifying a reference value for increasing or decreasing what amount of an adjustment value controlled by depression of the touch sensor (in which corresponds to the touch switch of the CRT touch switch apparatus disclosed in JP-A-63-034635, or to the touch panel of the grope operation apparatus disclosed in JP-A-2001-154766) from the present value cannot be identified. That is, in the CRT touch switch apparatus disclosed in JP-A-63-034635 described above, a direction in which the touch switch part is traced could be detected, but the amount of change in increase or decrease from the reference value could not be set. Also, in the grope operation apparatus disclosed in JP-A-2001-154766, the action commanded by the operator could be identified by the movement start end and the movement completion end of the contact point of the touch panel, but the amount of change in increase or decrease from the reference value could not be set.

SUMMARY OF THE INVENTION

It is therefore an object of the invention is to provide an electronic equipment capable of easily setting the amount of change in increase or decrease from a reference value with respect to an adjustment value controlled by depression of a touch sensor.

In order to achieve the object, according to one aspect of the invention, there is provided an electronic equipment including: a display device configured to display information and having a display surface; a touch sensor arranged on at least a part of the display surface; a guide portion configured to protrude from a surface of the touch sensor and to fringe the surface with a line having either a concave portion or a convex portion as a vertex in which configured as a reference position; and a controller configured to control an adjustment value in accordance with a direction of a slide operation from the reference position.

BRIEF DESCRIPTION OF THE DRAWINGS

The above objects and advantages of the present invention will become more apparent by describing in detail a preferred exemplary embodiment thereof with reference to the accompanying drawings, wherein.

DETAILED DESCRIPTION OF THE PREFERRED EMBODIMENTS

Figure 1:
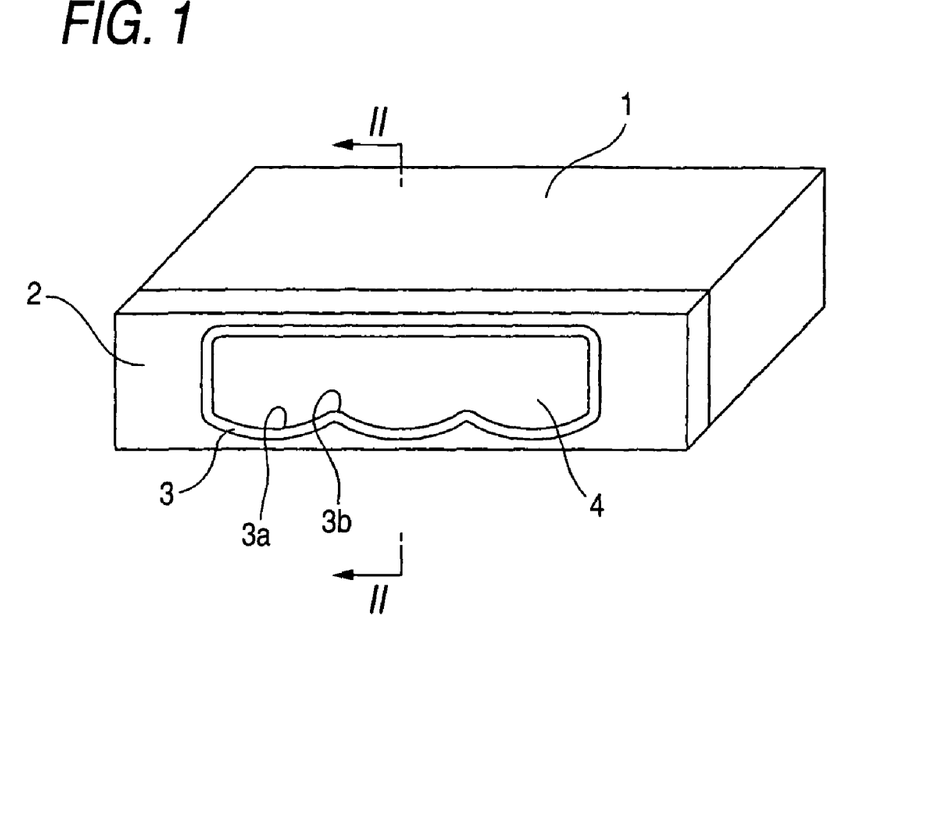
FIG. 1 is an outline view of a vehicle-mounted acoustic apparatus corresponding to an embodiment of electronic equipment of the invention.
Figure 2:
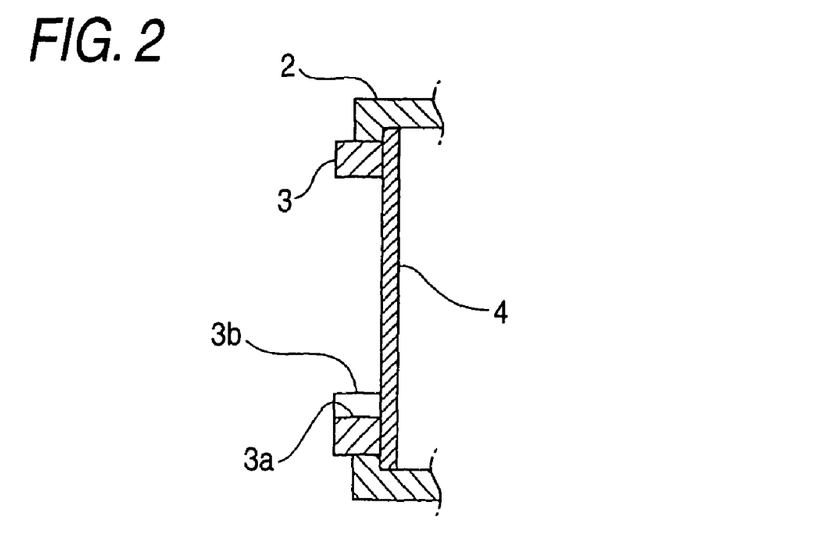
FIG. 2 is a part of a sectional view taken along line II-II of FIG. 1.

A preferred embodiment of electronic equipment of the present invention will be described hereinbelow with reference to the drawings by taking a vehicle-mounted acoustic apparatus as an example of the electronic equipment. FIG. 1 is an outline view showing a structure of the vehicle-mounted acoustic apparatus according to the embodiment of the invention. FIG. 2 is a part of a sectional view taken along line II-II in FIG. 1.

The vehicle-mounted acoustic apparatus shown in FIG. 1 is provided with an operating panel 2 on the front of a cabinet 1. As shown in FIGS. 1 and 2, a guide shape 3 (corresponding to guide portion) acting as an opening is formed in the approximately center of this operating panel 2 and the edge of the guide shape 3 has a shape protruding to the front side. A display touch sensor 4 having a display function and a switch function of shifting to an ON state in response to depression or contact is exposed to the inside of the guide shape 3, namely at the edge of the opening. In the vehicle-mounted acoustic apparatus, the touch sensor is configured to be placed on a display surface of a display. That is, the guide shape 3 is configured to protrude from a surface of the touch sensor and the surface thereof is edged with an edge portion of a curved line having concave portions 3a and convex portions 3b.

In the embodiment, the display (corresponding to display device) is constructed of an LCD (liquid crystal display) device. The touch sensor is constructed of a transparent conductive film using ITO (Indium Tin Oxide: a compound of indium, tin and oxygen) as material, and is formed on a display surface of the LCD by an electron beam evaporation method or a sputtering method. Incidentally, it is unnecessary to place the touch sensor on all the display surface of the display and the touch sensor may be placed on at least a part of the display surface, for example, only a range to be depressed.

Figure 3:
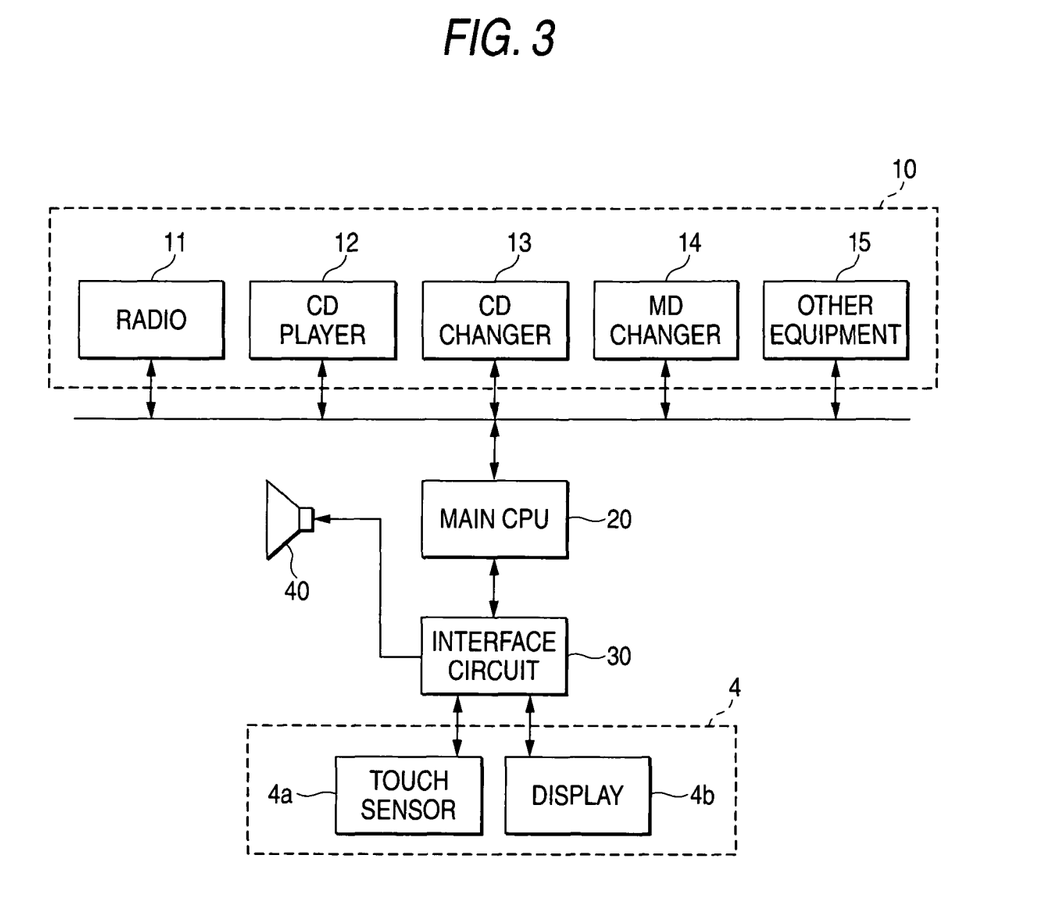
FIG. 3 is a block diagram showing a system configuration of the vehicle-mounted acoustic apparatus in the embodiment.

FIG. 3 is a block diagram showing a system configuration of the vehicle-mounted acoustic apparatus of FIG. 1. A sound source equipment 10 is configured to provide a sound source such as a sound or a musical sound and includes equipments such as a radio equipment 11, a CD player equipment 12, a CD changer equipment 13, an MD changer equipment 14 and other equipments 15. A main CPU 20 (corresponding to a controller) is connected to each of these devices through a system bus, and performs control with respect to each the equipment in response to a command of a user inputted from the display touch sensor 4. The main CPU 20 is connected to the display touch sensor 4 through an interface circuit 30, and captures a command from a touch sensor 4a in response to an operation of the user, and outputs image data to be displayed on a display 4b. The vehicle-mounted acoustic apparatus in the embodiment also has a speaker 40 (corresponding to a notification unit) connected to the interface circuit 30 and outputs a beep sound.

Figure 4:
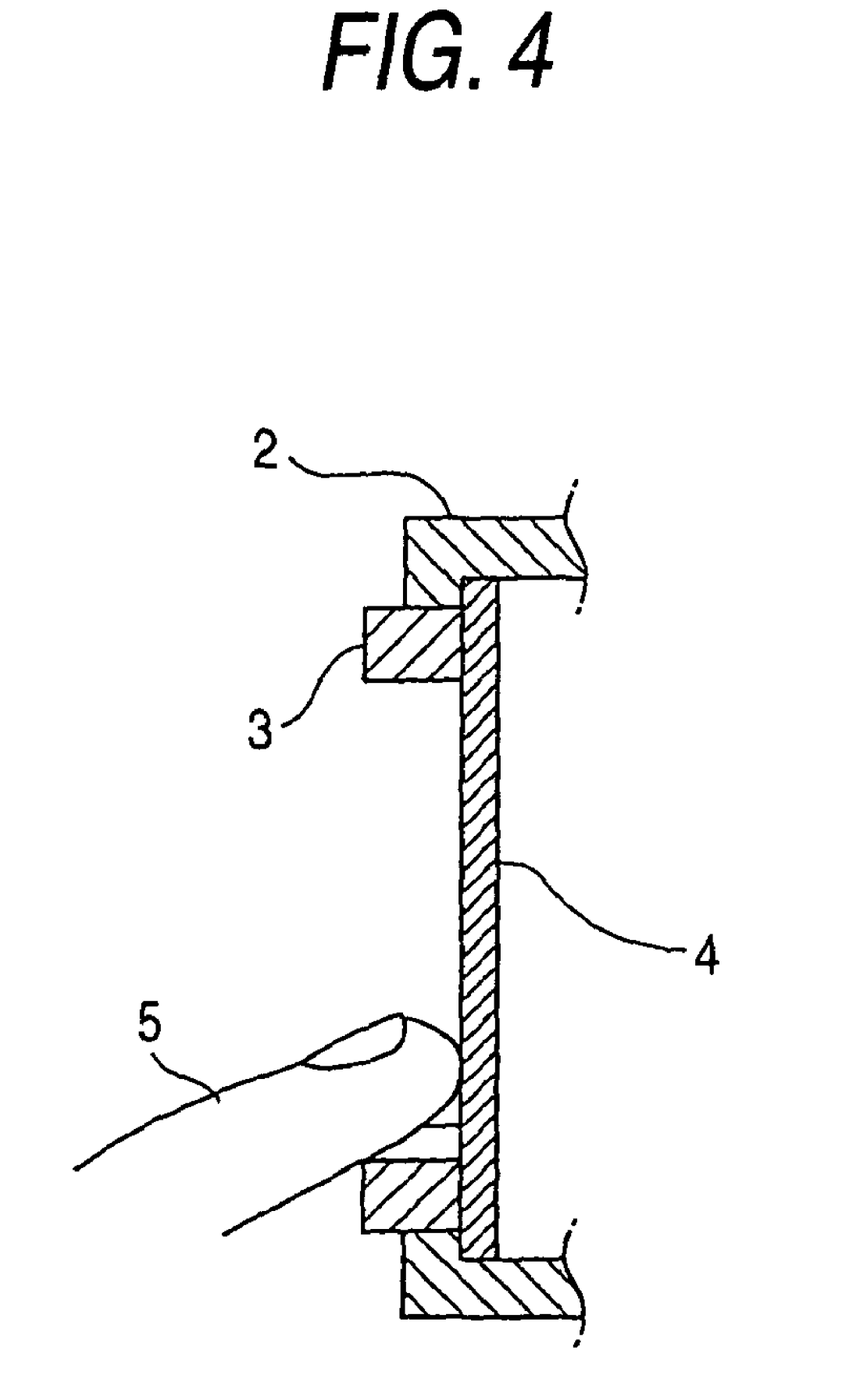
FIG. 4 is a diagram showing a situation in which a command is inputted from a touch sensor in the embodiment.

FIG. 4 is a diagram showing a situation in which a user inputs a command from the touch sensor 4a. As shown in this drawing, the user depresses a surface of the touch sensor 4a by a finger 5 and operates the vehicle-mounted acoustic apparatus. In the operation, the depression is performed with the finger 5 brought into contact with an edge portion of a curved line of the guide shape 3 for edging the surface of the touch sensor 4a, and a concave portion 3a of the curved line of the guide shape 3 is used as a vertex and a position of the touch sensor 4a corresponding to the vertex thereof is set to a reference position. The user can make a desired adjustment by performing depression and operation using its reference position as the center.

Figure 5A:
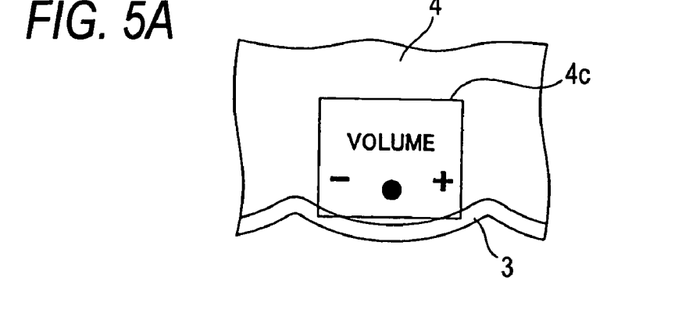
FIGS. 5a to 5d are diagrams showing an operation example of an adjustment to volume in the embodiment.
Figure 5B:
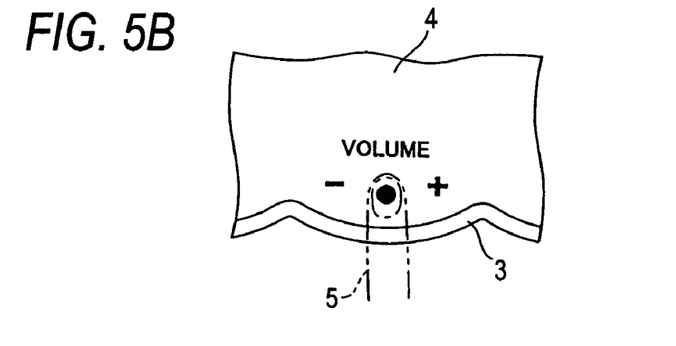
Figure 5C:
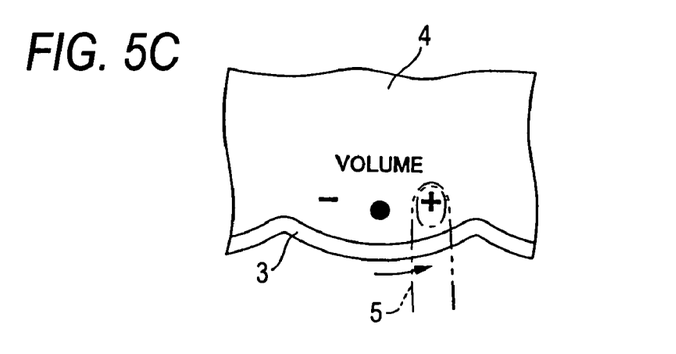
Figure 5D:
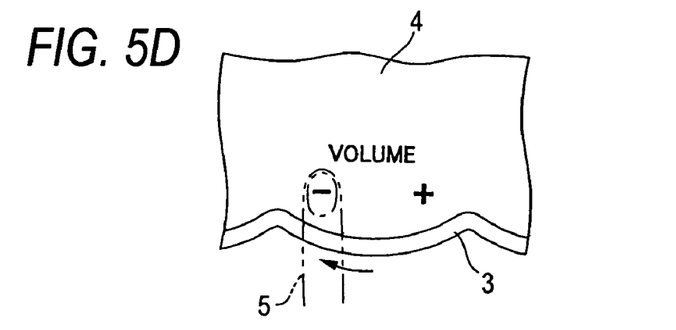

FIGS. 5a to 5d are diagrams showing an operation example of an adjustment to volume of sound outputted from the sound source equipment 10. In FIG. 5a, a " " mark (a mark illustrated in black dot) is displayed under a character of "VOLUME" in an area displayed on the display touch sensor 4. At the left and right sides of the "•" mark, "−" mark and "+" mark are displayed, respectively. As shown in FIG. 5b, when the "•" mark is depressed by the finger 5, volume is adjusted to the optimum value which is an initial value in a level adjustment range. Next, for example, as shown in FIG. 5c, when the finger 5 is slid (dragged) from the "•" mark to the "+" mark with the finger 5 depressed (in an arrow direction of the drawing), the CPU 20 controls the volume to be increased. Contrary, as shown in FIG. 5d, when the finger 5 is slid from the "•" mark to the "−" mark with the finger 5 depressed (in direction represented by an arrow in the drawing), the CPU 20 controls the volume to be decreased.

Figure 6:
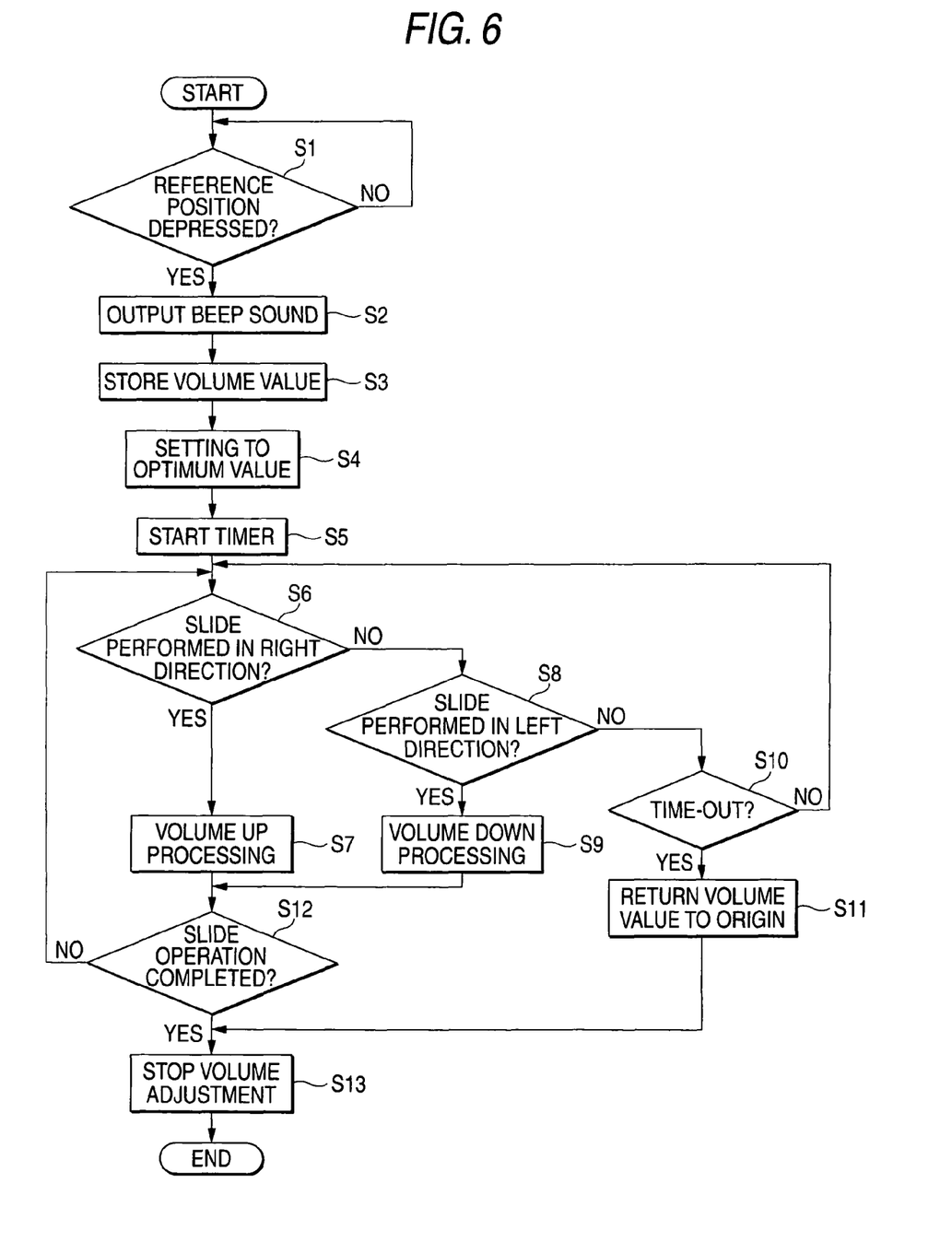
FIG. 6 is a flowchart of volume adjustment processing performed by a main CPU in the embodiment.
Figure 7A:
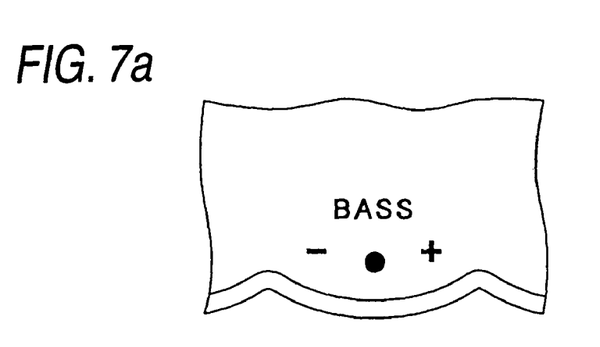
FIGS. 7a to 7d are diagrams showing display screens for adjusting "BASS", "TRE", "FED" and "BALANCE" in the embodiment.
Figure 7B:
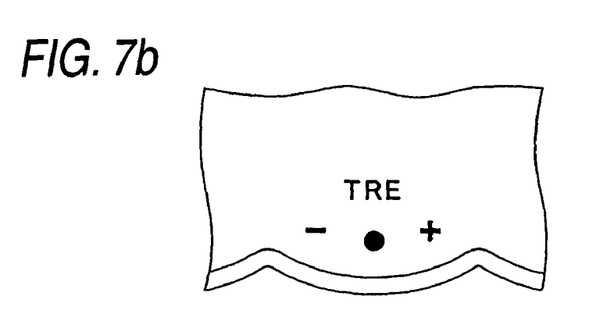
Figure 7C:
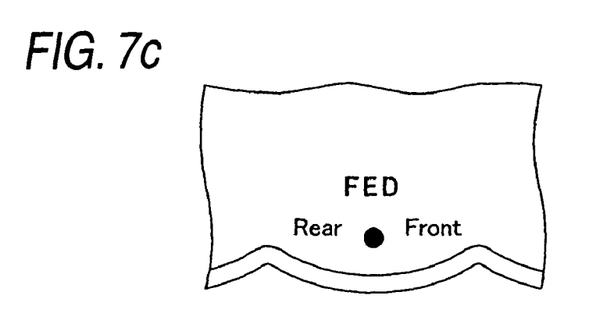
Figure 7D:
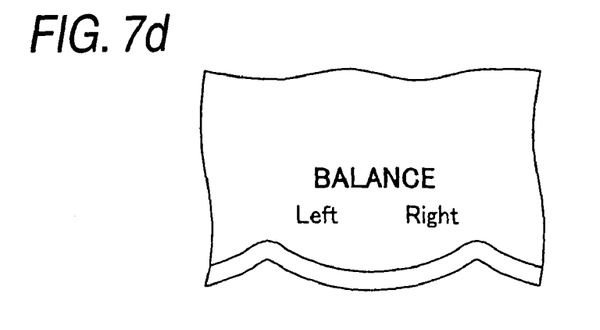

Hereinafter, an exemplary operation of control processing in the embodiment will be described by taking volume adjustment processing as an example. FIG. 6 is a flowchart of volume adjustment processing performed by the main CPU 20.

In step S1, The CPU 20 decides whether or not a reference position (a position of a "•" mark of FIG. 5) is depressed. In a case where the reference position is depressed, The CPU 20 notifies the user that the reference position is depressed by outputting a beep sound from the speaker 40 (step S2) and saves (stores) a volume value set at present to a predetermined register (step S3). In step S4, The CPU 20 sets the volume value to the optimum value registered previously and starts a timer for counting available time of a volume operation (step S5).

After the reference position is depressed, In step S6, The CPU 20 decides whether or not a slide operation is performed on a touch sensor in the right direction from the reference position. In a case where the slide operation is performed in the right direction, namely the "+" mark side. The CPU 20 controls the volume value in an UP direction from the optimum value (step S7) In a case where the slide operation is not performed in the right direction, The CPU 20 decides whether or not the slide operation is performed in the left direction from the reference position in step S8. And when the slide operation is performed in the left direction, namely the "−" mark side, The CPU 20 controls the volume value in a DOWN direction from the optimum value (step S9).

When the slide operation is not performed in both of the right direction and the left direction. The CPU 20 decides whether or not a time-out of the timer occurs (step S10). In a case where the time-out does not occur, The CPU 20 returns the process to step S6 and decides whether or not the slide operation is performed. On the other hand, when the time-out occurs, the CPU 20 resumes the volume value to the original volume value stored to the register in step S3 (step S11).

After performing UP processing of the volume value in step S7 or performing DOWN processing of the volume value in step S9, the CPU 20 decides whether or not the slide operation is completed (step S12), and when the slide operation is not completed, the CPU 20 returns the process to step S6 and decides whether or not the slide operation is performed. When the slide operation is completed or after the volume value is returned to the original volume value in step S11, the CPU 20 performs volume stop processing (step S13) and ends the above described sequence of process.

Incidentally, in the process described above, the CPU 20 resumed the volume value to the original volume value in step S11 when the time-out occurs. However, the CPU 20 may resume volume value to the optimum value when the time-out occurs.

In the embodiment described above, the example of adjusting the volume value has been described, but with respect to adjustment to bass (BASS), adjustment to treble (TRE), adjustment to a front-to-back ratio of volume (FED) and adjustment to a right and left ratio of volume (BALANCE), in a manner similar to the embodiment, a desired adjustment can be made by using the concave portion 3a of the curved line of the guide shape 3 as a vertex and setting a position of the touch sensor 4a corresponding to its vertex to a reference position and performing depression and a slide operation using its reference position as the center. FIGS. 7a, 7b, 7c and 7d are diagrams showing display screens for adjusting "BASS", "TRE", "FED" and "BALANCE", respectively.

Figure 8:
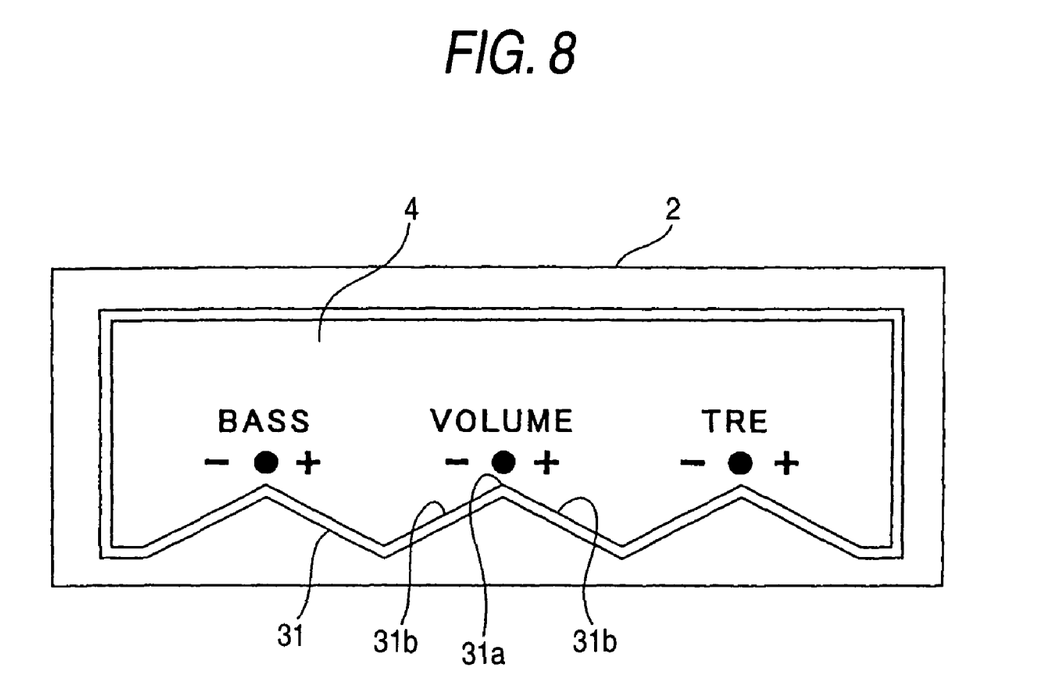
FIG. 8 is a diagram showing a structure in which a convex portion of a line of a guide shape in a modified example of the embodiment is used as a vertex.

The vertex of the curved line of the guide shape 3 is not limited to the concave portion 3a. FIG. 8 is a modified example of the embodiment, and is a diagram showing a structure in which a convex portion 31a of a curved line of a guide shape 31 is used as a vertex. Also in this case of FIG. 8, in a manner similar to the case of FIG. 5, a desired adjustment can be made by setting the convex portion 31a to a reference position of a touch sensor 4a and performing a slide operation in a direction of inclined portions 31b formed in the right and left of the convex portion 31a.

According to the embodiment, in the case of operating a touch sensor placed on a display surface of display device, a finger is brought into contact with guide portion protruding from a surface of the touch sensor and a concave portion or a convex portion forming a curved line of the guide portion is used as a vertex and an adjustment value is changed based on a direction of a slide operation from a reference position of the touch sensor corresponding to a vertex thereof, so that the vertex is located gropingly without viewing display and the adjustment value is changed based on a direction of a slide operation from the vertex and thereby the amount of change in increase or decrease from a reference value can be set easily with respect to the adjustment value controlled by depression of the touch sensor.

According to the embodiment of the invention, a reference value (optimum value) can be set very simply by depressing the reference position.

According to the embodiment of the invention, before adjustment, it first resumes to a reference value (optimum value) and adjustment from its reference value is made, so that an adjustment state can be grasped easily.

According to the embodiment of the invention, it can easily be recognized that it is set to a reference value (optimum value) by notification such as beep sounds.

According to a vehicle-mounted acoustic apparatus which is the embodiment of the invention, a concave portion or a convex portion forming a curved line of guide portion is used as a vertex and a slide operation from a reference position of a touch sensor corresponding to its vertex is performed, so that the vertex can be located gropingly to change an adjustment value of an output level of an acoustic signal even while driving a vehicle.

Incidentally, the reference value (optimum value) in the embodiment may be constructed so as to be able to be registered in an arbitrary value by the user. In this case, it may be constructed so that in a state of being set to an adjustment value which the user wants to register, for example, a reference position of a "•" mark of the display touch sensor 4 continues to be depressed for a predetermined time or longer, or the reference position of the "•" mark and another key (may be another mark of the display touch sensor 4 or a mechanical key switch) are simultaneously depressed and thereby its adjustment value is registered as the reference value (optimum value).

The embodiment has been constructed so as to make a change in each the adjustment value premised on depression of the reference position, but in the case of performing a slide operation without depression of the reference position, it may be constructed so as to make a change from the adjustment value set at that time without being set to the reference value (optimum value). In this case, operability improves more.

In the embodiment, it goes without saying that similar effect can be obtained even in the case of using a touch panel using infrared rays.

In the embodiment, the electronic equipment of the invention has been described by taking a vehicle-mounted acoustic apparatus as an example, but the electronic equipment of the invention is not limited to the vehicle-mounted acoustic apparatus of the embodiment. That is, as long as the electronic equipment is constructed so as to have display device, a touch sensor placed on at least a part of a display surface of the display device, guide portion which protrudes from a surface of the touch sensor and fringes with said surface with a curved line using a concave portion or a convex portion as a vertex, and controller for setting a position of the touch sensor corresponding to the vertex of the curved line of the guide portion to a reference position and changing an adjustment value based on a direction of a slide operation from said reference position, the invention can be applied to any apparatus other than the vehicle-mounted acoustic apparatus.

According to electronic equipment of the invention configured as described above, in a case of operating the touch sensor placed on the display surface of display device, a finger is brought into contact with guide portion protruding from the surface of the touch sensor and the concave portion or the convex portion forming a curved line of the guide portion is used as the vertex and the adjustment value is changed based on a direction of the slide operation from the reference position of the touch sensor corresponding to the vertex thereof, so that the vertex is located gropingly without viewing display and the adjustment value is changed based on a direction of the slide operation from the vertex and thereby the amount of change in increase or decrease from a reference value can be set easily with respect to the adjustment value controlled by depression of the touch sensor.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An electronic equipment comprising:
    a display device configured to display information and including a display surface;
    a touch sensor arranged on at least a part of the display surface;
    a guide portion configured to protrude from a surface of the touch sensor and to fringe the surface with a line configured by a plurality of concave portions or a plurality of convex portions,
        each of the plurality of concave portions or the plurality of convex portions including a fixed reference position on a surface of the touch sensor graphically identified on said display surface and located between a vertex and a center of a corresponding concave portion or convex portion; and
    a controller configured to control each of a plurality of adjustment values in accordance with a direction of a slide operation along the corresponding concave portion or convex portion of said guide portion from a corresponding fixed reference position;
    wherein said plurality of adjustment values is controlled after said corresponding fixed reference position is depressed by a touch operation.

2. The electronic equipment as claimed in claim 1, wherein the controller sets the adjustment value to a predetermined reference value when the fixed reference position is depressed.

3. The electronic equipment as claimed in claim 2, wherein the controller changes the adjustment values from the reference value when the slide operation is performed after the fixed reference position is depressed.

4. The electronic equipment as claimed in claim 1 further comprising:
    a notification unit configured to provide a notification that the fixed reference position is depressed.

5. The electronic equipment as claimed in claim 1, wherein the controller controls an adjustment value of an output level of an acoustic signal.

6. The electronic equipment as claimed in claim 1, wherein said touch sensor includes one of a display function and a switch function.

7. The electronic equipment as claimed in claim 1, wherein said touch sensor arranged on said at least a part of said display surface is configured to be proximate to said guide portion.

8. The electronic equipment as claimed in claim 1, comprising:
a graphical image displayed on said display device in said surface of said touch sensor, wherein said graphical image corresponds to said fixed reference position.

9. The electronic equipment as claimed in claim 8, wherein said graphical image represents an initial value in a parameter adjustment range.

10. The electronic equipment as claimed in claim 9, comprising:
second and third graphical images displayed on said display device in said surface of said touch sensor on either side of said graphical image, wherein said second and third graphical images represent one of a value to be increased and a value to be decreased from said initial value in a parameter adjustment range.

11. A method of controlling electronic equipment, a touch sensor arranged on at least a part of a display surface, a guide portion configured to protrude from a surface of said touch sensor and to fringe said surface with a line configured by a plurality of concave portions or a plurality of convex portions,
each of the plurality of concave portions or the plurality of convex portions including a fixed reference position on a surface of the touch sensor graphically identified on said display surface and located between a vertex and a center of a corresponding concave portion or convex portion, said method comprising:
guiding a finger along said guide portion to said fixed reference position;
depressing said fixed reference position to initiate control of each of a plurality of adjustment values in accordance with a direction of a slide operation along the corresponding concave portion or convex portion of the guide portion from a corresponding fixed reference position; and
receiving a contact input on said surface of said touch sensor adjacent to said fixed reference position based on guiding said finger along said guide portion from said fixed reference position.

12. The method of controlling electronic equipment as claimed in claim 11, further comprising:
displaying a graphical image on said display device in said surface of said touch sensor, wherein said graphical image represents an initial value in a parameter adjustment range and corresponds to said fixed reference position.

13. The method of controlling electronic equipment as claimed in claim 12, further comprising:
displaying second and third graphical images displayed on said display device in said surface of said touch sensor on either side of said graphical image, wherein said second and third graphical images represent one of a value to be increased and a value to be decreased from said initial value in a parameter adjustment range.

14. The method of controlling electronic equipment as claimed in claim 11, further comprising:
receiving sliding contact input on said surface of said touch sensor adjacent to said fixed reference position; and
inputting said adjustment value to a controller based on receiving said sliding contact input.

15. The method of controlling electronic equipment as claimed in claim 14, wherein receiving sliding contact input on said surface of said touch sensor in a first direction inputs a positive adjustment value to a controller.

16. The method of controlling electronic equipment as claimed in claim 14, wherein receiving sliding contact input on said surface of said touch sensor in a second direction inputs a negative adjustment value to a controller.

17. The method of controlling electronic equipment as claimed in claim 11, further comprising:
storing a present value of an adjustment parameter in response to receiving said contact input on said surface of said touch sensor adjacent to said fixed reference position.

18. The method of controlling electronic equipment as claimed in claim 17, further comprising:
determining whether said slide operation is performed on said surface of said touch sensor.

19. The method of controlling electronic equipment as claimed in claim 18, further comprising:
adding said adjustment values to said stored present value of an adjustment parameter in response to determining whether said slide operation is performed; and
controlling an output parameter based on adding said adjustment values to said stored present value of an adjustment parameter.

20. An electronic equipment comprising:
display means for displaying information, said display means including a display surface;
touch sensor means for sensing a touch, said touch sensor means being arranged on at least a part of said display surface means;
guide means configured to protrude from a surface of the touch sensor means and to fringe the surface with a line configured by a plurality of concave portions or a plurality of convex portions,
each of the plurality of concave portions or the plurality of convex portions including a fixed reference position on a surface of the touch sensor means graphically identified on said display surface and located between a vertex and a center of a corresponding concave portion or convex portion; and
control means for controlling each of a plurality of adjustment values in accordance with a direction of a slide operation along the corresponding concave portion or convex portion of said guide means from a corresponding fixed reference position;
wherein said plurality of adjustment values is controlled after said fixed reference position is depressed by a touch operation.

21. The electronic equipment according to claim 1, further comprising:
a storage unit which stores a current adjustment value when the fixed reference position is depressed.

22. The electronic equipment according to claim 21, further comprising:
a timer which counts a predetermined time period from a time when the fixed reference position is depressed,
wherein the controller controls the adjustment values in accordance with the slide operation starting during the predetermined time period.

23. The electronic equipment according to claim 22, wherein, when the timer finishes counting of the predetermined time period, the controller sets the adjustment value to the current adjustment values stored in the storage unit if no slide operation is performed during the predetermined time period.

24. The electronic equipment according to claim 22, wherein, when the timer finishes counting of the predetermined time period, the controller sets the adjustment values to a predetermined reference value if no slide operation is performed during the predetermined time period.

25. The electronic equipment according to claim 1, wherein said plurality of concave portions are arranged along a straight line and said plurality of convex portions are arranged along a straight line.

26. The electronic equipment according to claim 1, further comprising:
  a frame, which holds the display device and the touch sensor,
  wherein the frame has an opening through which the display surface of the display device is exposed,
  wherein the guide portion is provided on the opening of the frame, and
  wherein the guide portion protrudes from the surface of the touch sensor farther than the frame.

* * * * *